US008358895B2

(12) United States Patent
Noda et al.

(10) Patent No.: US 8,358,895 B2
(45) Date of Patent: Jan. 22, 2013

(54) TWO-DIMENSIONAL PHOTONIC CRYSTAL

(75) Inventors: Susumu Noda, Uji (JP); Takashi Asano, Kyoto (JP); Hitoshi Kitagawa, Sendai (JP)

(73) Assignees: Kyoto University, Kyoto-shi (JP); Alps Electric Co., Ltd., Tokyo (JP)

( * ) Notice: Subject to any disclaimer, the term of this patent is extended or adjusted under 35 U.S.C. 154(b) by 571 days.

(21) Appl. No.: 12/225,185

(22) PCT Filed: Mar. 20, 2007

(86) PCT No.: PCT/JP2007/000269
§ 371 (c)(1),
(2), (4) Date: Oct. 16, 2008

(87) PCT Pub. No.: WO2007/108219
PCT Pub. Date: Sep. 27, 2007

(65) Prior Publication Data
US 2009/0263094 A1    Oct. 22, 2009

(30) Foreign Application Priority Data

Mar. 20, 2006    (JP) ................................ 2006-077600

(51) Int. Cl.
*G02B 6/10*    (2006.01)

(52) U.S. Cl. ..................................................... 385/129
(58) Field of Classification Search ................... 385/129
See application file for complete search history.

(56) References Cited

U.S. PATENT DOCUMENTS
5,990,850 A  * 11/1999  Brown et al. ................. 343/912
(Continued)

FOREIGN PATENT DOCUMENTS
EP         1 607 770 A1     12/2005
JP       A-2001-272555      10/2001
(Continued)

OTHER PUBLICATIONS

Yablonovitch et al.; "Photonic Band Structure: The Face-Centered-Cubic Case Employing Nonspherical Atoms," *Physical Review Letters*; Oct. 21, 1991; pp. 2295-2298; vol. 67, No. 17.

(Continued)

*Primary Examiner* — Uyen Chau N Lee
*Assistant Examiner* — Hoang Tran
(74) *Attorney, Agent, or Firm* — Oliff & Berridge, PLC

(57) ABSTRACT

Holes 12 are created in a slab-shaped body 11. On the first surface 131 of the body 11, the holes 12 are arranged at the lattice points of a triangular lattice 141. On the second surface 132, they are arranged at the lattice points 122 located at positions corresponding to the gravity center of a triangular lattice 141. Three air columns 12A obliquely extend from each lattice point 121 to the nearest three lattice points 122. Similarly, three air columns 12A obliquely extend from each lattice point 122 to the nearest three lattice points 121. In this construction, a periodic structural unit 16 consisting of three holes is created within the body 11 and this unit has a $C_{3v}$-symmetrical shape at any section 14 parallel to the body 11. Due to this symmetry and the obliquely extending form of the air column 12A, a complete PBG with a large width is obtained. In one embodiment, a broad complete PBG whose width equals 15% of its middle value is obtained.

12 Claims, 6 Drawing Sheets

U.S. PATENT DOCUMENTS

| | | | |
|---|---|---|---|
| 2003/0231884 A1* | 12/2003 | Koyama | 398/68 |
| 2004/0081388 A1* | 4/2004 | Koyama | 385/16 |
| 2005/0047742 A1* | 3/2005 | Kitagawa et al. | 385/129 |
| 2005/0220402 A1* | 10/2005 | Takagi et al. | 385/31 |
| 2006/0024011 A1 | 2/2006 | Enokido | |

FOREIGN PATENT DOCUMENTS

| | | |
|---|---|---|
| JP | A-2005-099672 | 4/2005 |
| JP | A-2006-065150 | 3/2006 |
| WO | WO 2004/086102 A1 | 10/2004 |

OTHER PUBLICATIONS

Kitakawa et al.; "Sankaku Koshi $C_{3v}$ Taisho Ko 2Jigen Photonic Kessho Slab no Riron Kaiseki (V);" *2005 Nen Shuki Sai 66 Kai Extended Abstracts*; Sep. 7, 2005; p. 917.

Kitakawa et al.; "Keisha Ko 2jigen Photonic Kessho Slab no Ronri Kaiseki;" *2006 Nen Shunki Dai 53 Kai Extended Abstracts*; Mar. 22, 2006; p. 1116.

* cited by examiner (a)

(b)

(a) 1ST SECTION 151  (b) 2ND SECTION 152

(a)

(b)

(a)

(b)

(c)

(d)

(a) 1ST SECTION 151

(b) 2ND SECTION 152

TWO-DIMENSIONAL PHOTONIC CRYSTAL

TECHNICAL FIELD

The present invention relates to a two-dimensional photonic crystal that can be applied to an optical multiplexer/demultiplexer or other devices in wavelength division multiplexing or similar technical fields. It should be noted that the term "light" or "optical" used in this patent application generally includes electromagnetic waves as well as visible light.

BACKGROUND ART

In the field of optical multiplexer/demultiplexer or other optical communication devices used in wavelength division multiplexing (WDM) communications, photonic crystals have been drawing attention as a promising material for the development of devices that are higher in performance yet smaller in size and can be manufactured at low costs. A photonic crystal is a dielectric object having an artificial periodic structure. Typically, the periodic structure is created by providing the dielectric body with a periodic arrangement of modified refractive index areas, i.e. the areas whose refractive index differs from that of the body. Within the crystal, the periodic structure creates a band structure with respect to the energy of light and thereby produces an energy region in which the light cannot be propagated. Such an energy region is called the "photonic band gap" or "PBG." The energy region (or wavelength band) at which the PBG is created depends on the refractive index of the dielectric body and the cycle distance of the periodic structure.

Introducing an appropriate defect into the photonic crystal creates a specific energy level within the PBG ("defect level"), and only a ray of light having a wavelength corresponding to the defect level is allowed to be present in the vicinity of the defect. This means that a photonic crystal having such a defect will function as an optical resonator that resonates with light having a specific wavelength. Furthermore, forming a linear defect will enable the crystal to be used as a waveguide.

As an example of the above-described technique, Patent Document 1 discloses a two-dimensional photonic crystal having a body (slab) provided with a periodic arrangement of modified refractive index areas, in which a linear defect of the periodic arrangement is created to form a waveguide and a point-like defect is created adjacent to the waveguide. This two-dimensional photonic crystal functions as the following two devices: a demultiplexer for extracting a ray of light whose wavelength equals the resonance frequency of the resonator from rays of light having various wavelengths and propagated through the waveguide and for sending the extracted light to the outside; and a multiplexer for introducing the same light from the outside into the waveguide.

Including the one disclosed in Patent Document 1, many two-dimensional photonic crystals are designed so that the PBG becomes effective for either a TE-polarized light, in which the electric field oscillates in the direction parallel to the body, or a TM-polarized light, in which the magnetic field oscillates in the direction parallel to the body. According to this design, if a ray of light containing both kinds of polarized light is introduced into the waveguide or resonator of the two-dimensional photonic crystal, the propagating efficiency of the waveguide deteriorates since one of the two kinds of polarized light diffuses within the body. For example, in a two-dimensional photonic crystal in which the periodic structure has a triangular lattice pattern and each modified refractive index area is circular (or cylindrical), the PBG will be effective for only the TE-polarized light, and a TE-polarized light whose wavelength is within a wavelength range corresponding to the PBG cannot be present within the body. Accordingly, almost no loss of the TE-polarized light will occur at the waveguide or resonator. On the other hand, a TM-polarized light whose wavelength is within the aforementioned wavelength range can escape from the waveguide or resonator into the body and be lost since there is no PGB for the TM-polarized light.

Taking the above problem into account, studies have been conducted on a new design of two-dimensional photonic crystal having a PBG for each of the TE-polarized light and the TM-polarized light in which the two PBGs have a common band. This band is hereinafter called the "complete photonic band gap" or "complete PBG". For example, Patent Document 2 discloses a two-dimensional photonic crystal in which a complete PBG is created by periodically arranging holes with a $C_{3v}$-symmetrical shape in a triangular lattice pattern. The $C_{3v}$ symmetry is a symmetry that has an axis of three-fold rotational symmetry and three vertical symmetry planes including the axis. For example, an equilateral triangle is a $C_{3v}$-symmetrical figure. This two-dimensional photonic crystal prevents any light whose wavelength is included in the complete PBG from leaking from the waveguide, resonator or other element into the body, irrespective of whether the light is TE or TM polarized. Thus, the deterioration of the propagation efficiency of the waveguide is prevented.

In addition, there are two notation system for representing symmetry, i.e. the Hermann-Mauguin notation and Schoenflies notation. The "$C_{3v}$" symmetry is a Schoenflies notation and can also be expressed as "3 m" using Hermann-Mauguin notation.

Patent Document 3 discloses a two-dimensional photonic crystal with a complete PBG created by periodically arranging holes in a triangular lattice pattern, in which each hole has a $C_{3v}$-symmetrical shape at a section parallel to the body ("in-plane section") as in the two-dimensional photonic crystal disclosed in Patent Document 2, and the sectional shape of the hole varies along the thickness direction. As an example of such a hole, Patent Document 3 illustrates a hole whose in-plane sectional shape is an equilateral triangle and whose side length changes along the thickness direction. Another example illustrated in the document is a hole whose in-plane sectional shape is identical except at the upper or lower end portion, at which the hole is filled with the same material as that of the body.

Non-Patent Document 1 discloses a three-dimensional photonic crystal known as "Yablonovite." Yablonovite is a block-shaped dielectric material with a triangular lattice formed on its surface, in which the hole at each lattice point is extended in three directions (at 120° intervals) with an angle of 35° from the surface normal. This structure has a diffraction index that is periodically distributed not only within the plane parallel to the surface of the dielectric block, but also along the depth of the dielectric block. As a result, a complete PBG is created in any direction within the crystal. This PBG is a complete PBG that does not depend on the polarizing direction.

Patent Document 1: Japanese Unexamined Patent Application Publication No. 2001-272555 (Paragraphs [0023] to [0027] and [0032]; FIGS. 1, 5 and 6)

Patent Document 2: Japanese Unexamined Patent Application Publication No. 2005-099672 (Paragraphs [0008], [0034], [0040], [0054] and [0055]; FIGS. 1 and 10 to 15)

Patent Document 3: Japanese Unexamined Patent Application Publication No. 2006-065150 (Paragraphs [0019], [0020] and [0036]; FIGS. 1 and 3)

Non Patent Document 1: E. Yablonovitch et al. "Photonic band structure: The face-centered-cubic case employing non-spherical atoms", *Physical Review Letters* 67 (1991) 2295-2298.

DISCLOSURE OF THE INVENTION

Problem to be Solved by the Invention

Increasing the width of the complete PBG leads to a higher degree of freedom in the designing of optical devices. For example, it will be easier to adjust the transmission wavelength band of the waveguide to the resonance wavelength of the resonator for both TE and TM polarizations. An index for evaluating the width of the complete PBG is a value obtained by dividing the band width by the middle value of the energy of the complete band PBG. For optical communications devices, it is generally said that the PBG should desirably have a width index of 10% or greater. However, the width of the complete PBG of the two-dimensional photonic crystal disclosed in Patent Documents 2 and 3 is no higher than 4.4%. This means that the PBG is not adequately wide.

The two-dimensional photonic crystal disclosed in Patent Documents 3 is difficult to manufacture since each of the modified refractive index areas must be shaped into a complex form.

The photonic crystal disclosed in Non-Patent Documents 1 is a three-dimensional photonic crystal, in which a periodic structure of the holes needs to be created also in the depth direction. This structure is also difficult to manufacture since the holes need to be deeper than in the case of a two-dimensional photonic crystal.

Thus, a problem to be solved by the present invention is to provide a two-dimensional photonic crystal with a wider complete PBG and/or a two-dimensional photonic crystal that has a complete PBG yet is easy to manufacture. The present invention also provides an optical device using such a two-dimensional photonic crystal.

Means for Solving the Problems

To solve the aforementioned problems, the present invention provides a two-dimensional photonic crystal including a slab-shaped body provided with a periodic arrangement of modified refractive index areas whose refractive index differs from that of the body, wherein:

on a first surface, which is one of the surfaces of the body, the modified refractive index areas are arranged in a triangular lattice pattern and have at least a three-fold rotational symmetry with respect to each lattice point;

on a second surface, which is the other surface of the body, the modified refractive index areas are arranged in a triangular lattice pattern whose position is complementary to the triangular lattice on the first surface, and have at least a three-fold rotational symmetry with respect to each lattice point; and the modified refractive index area has columns each extending from one lattice point on the first surface to each of three lattice points on the second surface that are the nearest to the aforementioned lattice point on the first surface.

The configuration in which the position of the triangular lattice on the second surface is complementary to the triangular lattice on the first surface can be defined as a configuration in which each lattice point of the triangular lattice on the second surface is located at the gravity center of each triangle constituted by the lattice points of the triangular lattice on the first surface.

Since the position of the triangular lattice on the first surface and that of the triangular lattice on the second surface are complementary to each other, the state that the modified refractive index area has columns each extending from one lattice point on the first surface to each of three lattice points on the second surface that are the nearest to the aforementioned lattice point on the first surface, can be conversely interpreted as the state the modified refractive index area has columns each extending from one lattice point on the second surface to each of three lattice points on the first surface that are the nearest to the aforementioned lattice point on the second surface. Starting from one section on one of the two surfaces ("area section"), the three columns of the modified refractive index area gradually separate from each other as they extend deeper inside the body. Meanwhile each column gradually converges with other columns extending from other area sections as it approaches the other surface, and these columns are completely integrated at an area section on the other surface. Thus, from each area section on the first and second surfaces, the columns of the modified refractive index area in a trident form extend in the thickness direction of the body. It should be noted that the modified refractive index area exhibits no periodic pattern in the thickness direction.

On each of the first and second surfaces, the modified refractive index areas should be arranged so that they have at least a three-fold rotational symmetry with respect to each lattice point. For example, this requirement can be satisfied by using a circular modified refractive index area. Another possible configuration is that the modified refractive index areas each have a three-fold symmetrical shape (e.g. an equilateral triangle) or six-fold symmetrical shape (e.g. a regular hexagon) and are arranged at each lattice point and in the same direction.

Within this two-dimensional photonic crystal, the periodic structural unit of the triangular lattice at a given in-plane section is formed by three modified refractive index areas extending from a single lattice point on the first surface if the in-plane section is located closer to the first surface than to the second, or three modified refractive index areas extending from a single lattice point on the second surface if the in-plane section is located closer to the second surface than to the first. The previously described arrangement of the holes on each of the first and second surfaces provides the in-plane sectional shape of the periodic structural unit with either a three-fold or six-fold rotational symmetry. The three-fold rotational symmetry can be expressed as "$C_3$" in Schoenflies notation or "3" in Hermann-Mauguin notation. Similarly, the six-fold rotational symmetry can be expressed as "$C_6$" in Schoenflies notation or "6" in Hermann-Mauguin notation. Any of these symmetries creates a complete PBG in the two-dimensional photonic crystal.

It is preferable that the in-plane sectional shape of the periodic structural unit further have a symmetry with three (in the case of the three-fold rotational symmetry) or six (in the case of the six-fold rotational symmetry) vertical symmetry planes each including the axis of rotational symmetry. In the former case, the modified refractive index areas are identical to those of the two-dimensional photonic crystals disclosed in Patent Document 2 and 3 and can be expressed as $C_{3v}$ (3 m), as explained earlier. The latter case is expressed as "$C_{6v}$" in Schoenflies notation or "6 m" in Hermann-Mauguin notation. The $C_{3v}$ symmetry can be achieved, for example, by shaping each column of the modified refractive index area so that its section parallel to the body (area section) is circular. The $C_{3v}$ symmetry is also achieved in the case where the area section is an equilateral triangle and its three sides are parallel to the triangular lattice. The $C_{6v}$ symmetry is achieved, for example, if the area section is a regular hexagon and its six sides are parallel or perpendicular to the triangular lattice.

As stated earlier, according to Patent Document 3, changing the modified refractive index areas in the thickness direction within the body of a two-dimensional photonic crystal suppresses the electric field oscillating in the direction parallel to the body, so that a PBG is created for the TM polarization. Accordingly, it is possible to vary the width of the PBG by changing the shape of the modified refractive index areas along the thickness direction of the body and appropriately adjusting the degree of the change in shape. In the two-dimensional photonic crystal according to the present invention, the ratio of the body thickness to the cycle distance of the triangular lattice determines the angle of the columns of the modified refractive index area extending vertically (or obliquely) within the body and also the degree of divergence/convergence of the columns extending in the thickness direction of the body. Therefore, it is possible to change the PBG width by appropriately regulating the body thickness to the cycle distance of the triangular lattice. A calculation conducted by the inventors has demonstrated that a complete PBG with a width of approximately 15% is obtained when the body thickness is 0.8 times the cycle distance of the triangular lattice.

The modified refractive index areas can be created by embedding appropriate members whose refractive index differs from that of the body or boring holes in the body. The latter method is more preferable since holes are easier to manufacture yet can provide an adequately large difference in the refractive index between the body and the modified refractive index area.

Providing a point-like defect of the modified refractive index areas in the two-dimensional photonic crystal according to the present invention results in an optical resonator device. Providing a linear defect of the modified refractive index areas in the two-dimensional photonic crystal according to the present invention results in an optical waveguide device. Providing at least one optical waveguide consisting of a linear defect of the modified refractive index areas in the two-dimensional photonic crystal according to the present invention and at least one optical resonator consisting of a point-like defect in the vicinity of the optical waveguide results in an optical multiplexer/demultiplexer device.

Effects of the Invention

In the two-dimensional photonic crystal according to the present invention, a complete PBG is obtained by creating a periodic structural unit having a three-fold or six-fold rotational symmetry.

As explained earlier, in the two-dimensional photonic crystal according to the present invention, the change in the in-plane sectional shape of the periodic structural unit along the thickness direction suppresses the electric field oscillating in the direction parallel to the body and thereby increases the width of the complete PBG. Furthermore, the degree of change of the modified refractive index area along the thickness direction can be arbitrarily determined by appropriately regulating the ratio of the body thickness to the cycle distance, whereby the width of the complete PBG can be controlled. This leads to the advantage that the width of the complete PBG can be controlled with a higher degree of freedom than in the case of adjusting the shape of each modified refractive index area. Specifically, a calculation conducted by the inventors has demonstrated that shaping the area section into a circle with a radius 0.32 times the cycle distance of the triangular lattice and giving the body a thickness 0.7 to 1.0 times the cycle distance of the triangular lattice results in a complete PBG with a large width of approximately 15%, which cannot be achieved by conventional two-dimensional photonic crystals.

The width of the complete PBG will further increase if the periodic structural unit is $C_{3v}$ or $C_{6v}$ symmetrical.

In the two-dimensional photonic crystal according to the present invention, each modified refractive index area provided within the body is shaped like a simple column. It is unnecessary to create a modified refractive index area having a complex shape as in the two-dimensional photonic crystal disclosed in Patent Document 3. Furthermore, there is no need to extend the modified refractive index area into depth since it is unnecessary to create a periodic structure in the depth (thickness) direction as in the three-dimensional photonic crystal disclosed in Non-Patent Document 1. Thus, the two-dimensional photonic crystal can be quite easily manufactured.

The modified refractive index areas in the present invention can be manufactured, for example, by an anisotropic etching method used in the production of a three-dimensional photonic crystal (Shigeki Takahashi et al., *Preprints of 66$^{th}$ Autumn Meeting of Japan Society of Applied Physics Autumn* 2005, Part 3, Lecture No. 8a-H-8). According to this method, the two-dimensional photonic crystal can be easily created by strongly etching a body material in an intended direction by the physical and/or chemical action of an incident plasma gas that is obliquely directed onto the body material by an electric field.

An optical resonator device, optical waveguide device or optical multiplexer/demultiplexer device using a two-dimensional photonic crystal according to the present invention has a wider complete PBG and an accordingly broader wavelength range in which light containing various components polarized in different directions can be propagated, multiplexed or demultiplexed. Accordingly, each device can have a larger number of light-propagation channels than in the conventional cases.

EXPLANATION OF NUMERALS

Figure 1:
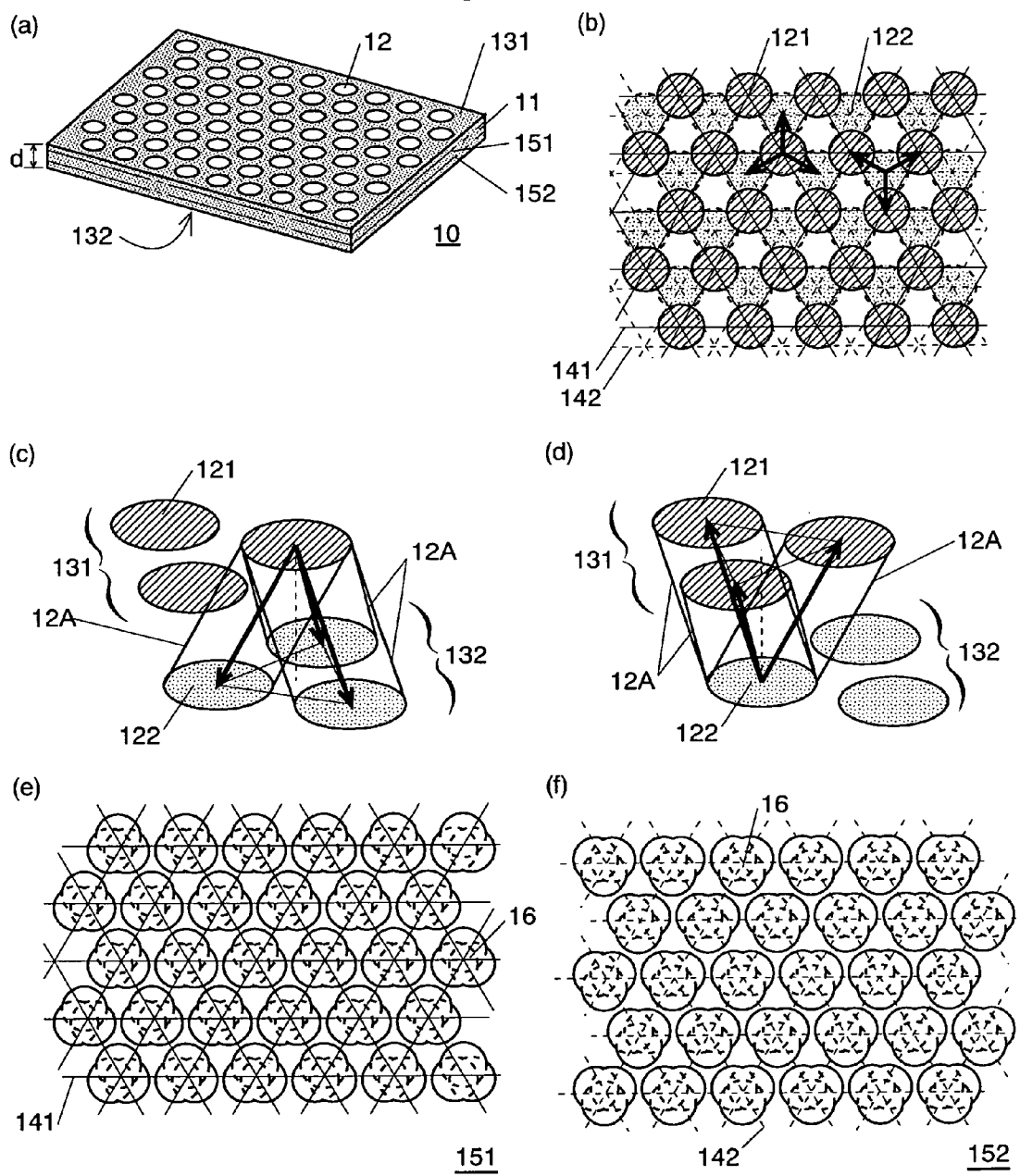
FIGS. 1(*a*) to 1(*f*) show an embodiment of the two-dimensional photonic crystal according to the present invention, where (a) is a perspective view of the body, (b) is a surface view of a first surface 131 and second surface, (c) and (d) are perspective views showing the shape of air columns 12A, and (e) and (f) are sectional views of the two-dimensional photonic crystal at in-plane sections 151 and 152, respectively.
Figure 2:
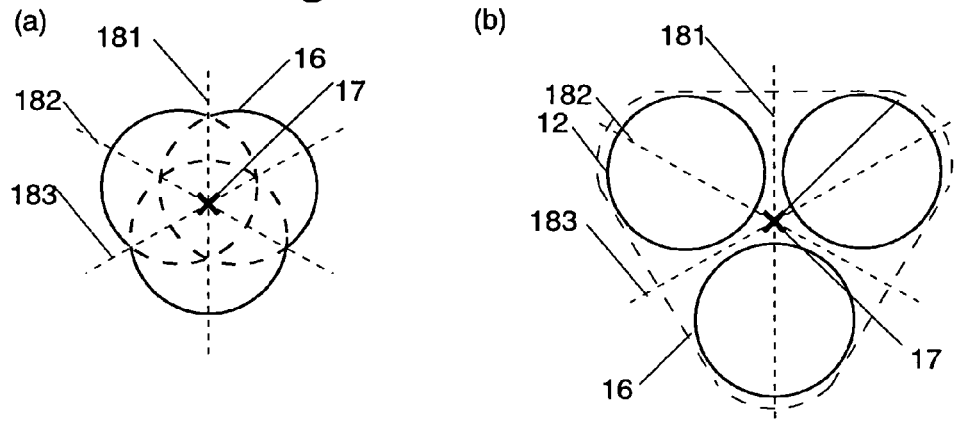
FIGS. 2(*a*) and 2(*b*) are plan views showing the shape of a periodic structural unit 16 in the two-dimensional photonic crystal according to the embodiment.

10 ... Two-Dimensional Photonic Crystal
11 ... Body
12, 22, 32 ... Hole
12A, 22A, 32A ... Air Column
121 ... Lattice Point of Triangular Lattice 141
122 ... Lattice Point of Triangular Lattice 142
131 ... First Surface
132 ... Second Surface
141 ... Triangular Lattice on First Surface 131
142 ... Triangular Lattice on Second Surface 132
151 ... In-Plane Section Closer to First Section 131 than to Second Surface 132
152 ... In-Plane Section Closer to Second Section 132 than to First Surface 131
16, 26, 36 ... Periodic Structural Unit
17 ... Axis of Rotational Symmetry
181, 182, 183 ... Vertical Symmetry Plane
40 ... Optical Multiplexer/Demultiplexer
41 ... Waveguide
42 ... Resonator

EMBODIMENTS

Embodiments of the two-dimensional photonic crystal according to the present invention are hereinafter described with reference to FIGS. 1 to 11.

FIG. 1(a) is a perspective view of a two-dimensional photonic crystal 10 according to one of the embodiments. On one surface of the slab-shaped body 11, circular holes 12 are periodically created. Holes are similarly arranged on the other surface, and the positions of the holes 12 on the two surfaces are complementary to each other. FIG. 1(b) shows the arrangements of the holes 12 on the first surface 131 (the upper surface in FIG. 1(a)) of the body 11 and the second surface 132 (the lower surface), with the two arrangements overlapping each other. The holes 12 on the first surface 131 are located at the lattice points 121 of the triangular lattice 141. The holes 12 on the second surface 132 are also located at the lattice points 122 of the triangular lattice 142 whose position is complementary to that of the triangular lattice 141 on the first surface 131. As shown by the thick arrows in FIGS. 1(b) and 1(c), three air columns 12A extend from each lattice point 121 on the first surface 131 to the three nearest lattice points on the second surface 132, respectively. Similarly, as shown by the thick arrows in FIGS. 1(b) and 1(d), three air columns 12A extend from each lattice point 122 on the second surface 132 to the three nearest lattice points on the first surface 131, respectively.

Each air column 12A is formed so that its in-plane sectional shape will always be a circle of the same diameter at any position in the thickness direction of the body 11. That is, the air column 12A is shaped like an oblique cylinder. However, it should be noted that plural air columns 12A overlap each other inside the body 11 and the shape of the overlapping area changes along the thickness direction of the body, as shown in FIGS. 1(e) and 1(f).

As a result of creating the air columns 12A in the previously described manner, a triangular lattice with a periodic structural unit 16 consisting of three holes 12 is formed at any in-plane section. At an in-plane section 151, which is located closer to the first surface 131 than to the second surface 132, each periodic structural unit 16 consists of three circular holes 12 located at the three vertexes of an equilateral triangle, respectively, and the periodic structural units are located at the lattice points identical to the triangular lattice 141 (FIG. 1(e)). On the other hand, at another in-plane section 152, which is located closer to the second surface 132 than to the first surface 131, each periodic structural unit 16 consists of three circular holes 12 located at the three vertexes of an equilateral triangle obtained by a 180° rotation of the aforementioned triangle at the in-plane section 151 about an axis perpendicular to the surface, and the periodic structural units are located at the lattice points identical to the triangular lattice 142 (FIG. 1(f)).

The in-plane sectional shape of the periodic structural unit 16 has a three-fold rotational symmetry around the rotation axis 17, as shown in FIG. 2(a). This in-plane sectional shape also has three vertical symmetry planes 181, 182 and 183, each including the rotational-symmetry axis 17. Thus, similar to the holes of the two-dimensional photonic crystals disclosed in Patent Documents 2 and 3, the periodic structural unit 16 in FIG. 2(a) has a $C_{3V}$-symmetrical in-plane sectional shape. If the radius of each hole is equal to or smaller than one quarter of the cycle distance of the triangular lattice, the three holes 12 will be separated from each other in the vicinity of the center of the body in the thickness direction (FIG. 2(b)). The three holes 12 thus separated can also act as a single periodic structural unit 16 since the mutual distance of the three holes is smaller than their distance from the other holes. The in-plane sectional shape of this version of periodic structural unit 16 also has a $C_{3v}$ symmetry including a three-fold rotational symmetry.

In the two-dimensional photonic crystal 10 of the present embodiment, the angle θ of the air column 12A changes depending on the ratio of the thickness d of the body 11 to the lattice constant a of the triangular lattices 141 and 142. For example, if the lattice constant a is fixed, the angle θ increases as the thickness d decreases. Accordingly, the periodic distribution of the refractive index created inside the body 11 by the air columns 12A can be controlled by regulating the lattice constant a and the thickness d.

Figure 3:
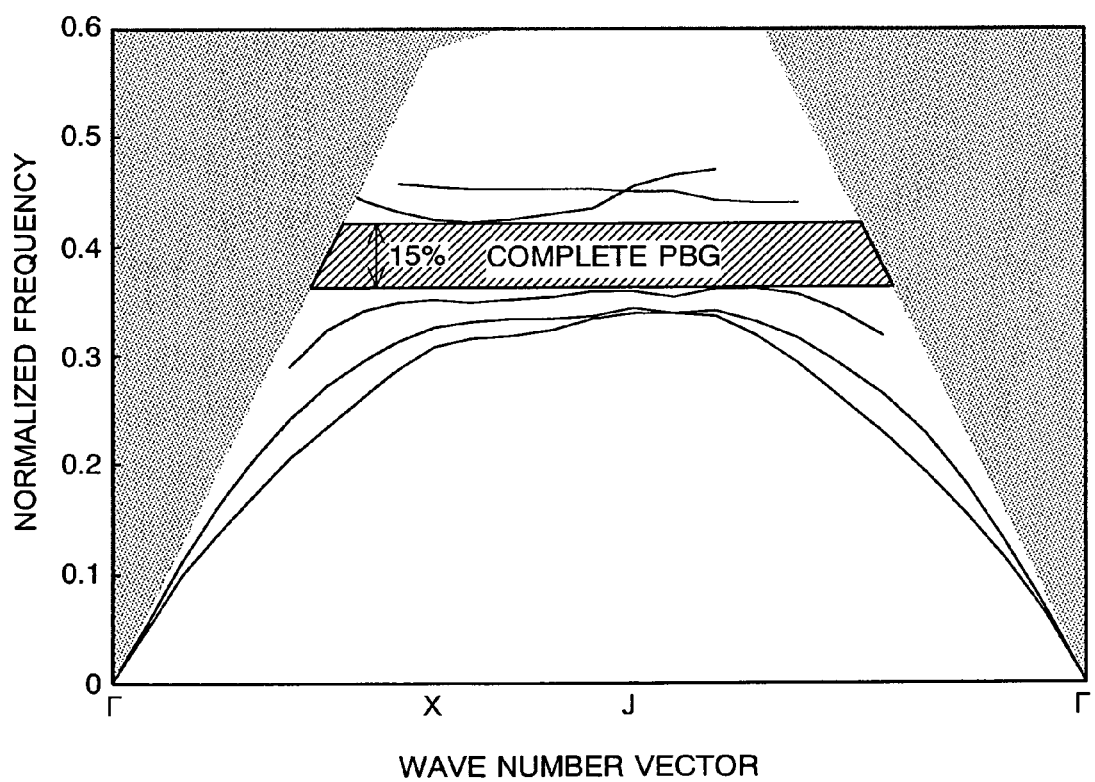
FIG. 3 is a diagram showing a calculated result of the photonic bands for the two-dimensional photonic crystal according to the embodiment.
Figure 4:
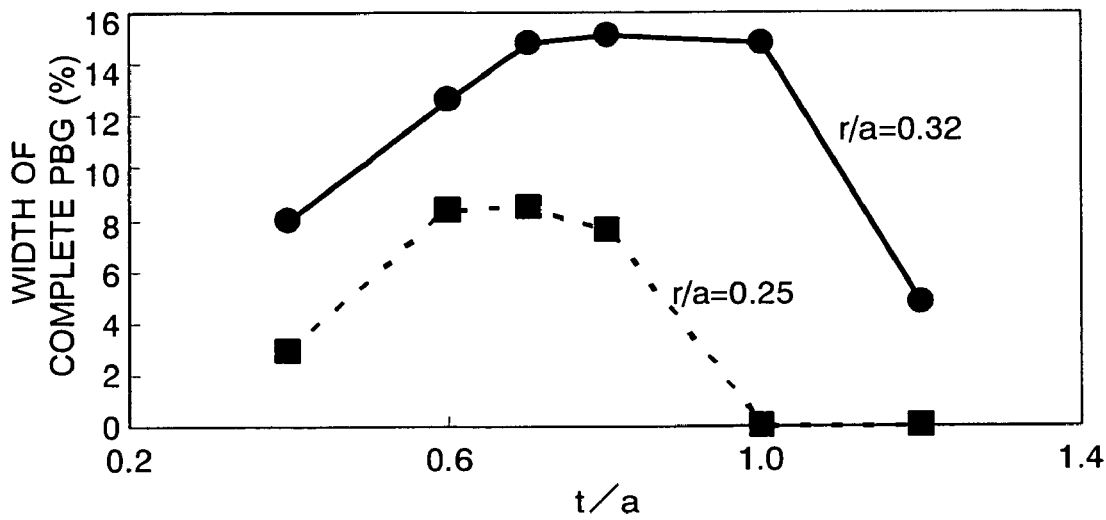
FIGS. 4(*a*) and 4(*b*) are graphs each showing a calculated result of the width of the complete PBG in the two-dimensional photonic crystal according to the embodiment.
Figure 4:
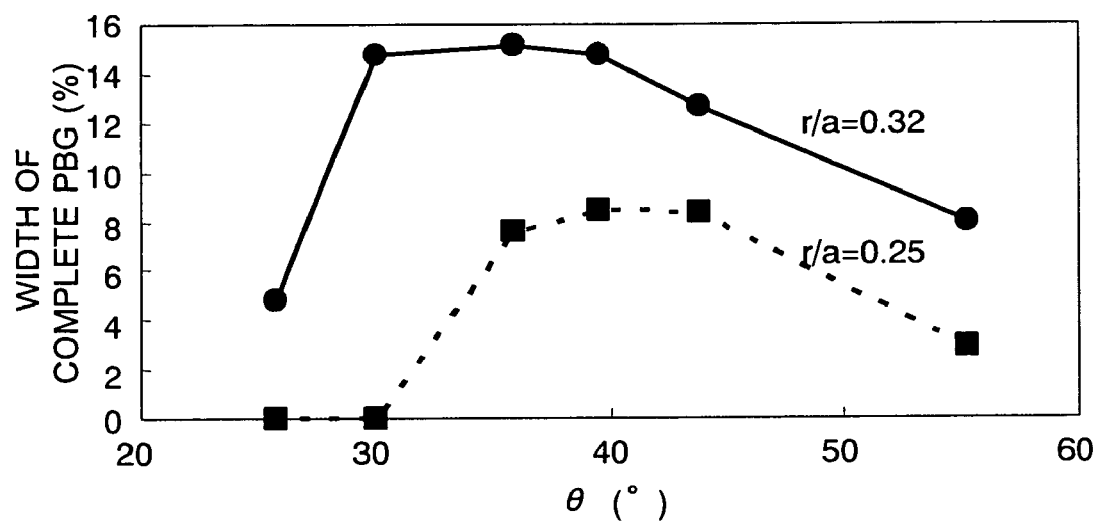

FIG. 3 is a graph showing the photonic bands for the two-dimensional photonic crystal 10 of the present embodiment, calculated by a three-dimensional finite difference time domain method. The calculation assumed that the r/a value obtained by dividing the radius r by the lattice constant a was 0.32 and the t/a value obtained by dividing the thickness t by the lattice constant a was 0.8. These conditions result in an angle θ of 36 degrees. The horizontal axis of the graph indicates the wave number vector, and the vertical axis indicates the normalized frequency, which is a dimensionless value obtained by multiplying a frequency value by a/c (where c is the speed of light). The curves in the graph represent photonic bands. In the present embodiment, the TE and TM polarizations cannot be clearly separated since the converging area of the holes changes its shape according to the position in the thickness direction within the body. Given this factor, the graph shows all the photonic bands regardless of the type of polarization. The calculated result demonstrated that a complete PBG (the shaded region in FIG. 3) was created over a range with a middle value of the normalized frequency approximately 0.4 and a width approximately 15% of the middle value.

FIG. 4(a) shows a calculated result of the width of the complete PBG for t/a values within a range from 0.4 to 1.2 under the condition that r/a was 0.32 or 0.25. FIG. 4(b) is a graph in which the same data as used in FIG. 4(a) are plotted against a horizontal axis indicating the angle θ between the air column and the normal to the body surface. For r/a=0.32, when t/a was within a range from 0.6 to 1.0, the resultant complete photonic PBG had a width equal to or larger than 10%, which is a generally desired minimum percentage for optical communication devices, as stated earlier. When t/a was 0.4 or 1.2, the resultant complete PBG had a width larger than 4.4%, which is the largest width of the complete PBG achieved by the two-dimensional photonic crystals disclosed in Patent Documents 2 and 3. For r/a=0.25, when t/a was within a range from 0.6 to 0.8, the width of the complete photonic PBG was approximately 8%, which is also larger than the widths of the complete PBG of the two-dimensional photonic crystals disclosed in Patent Documents 2 and 3.

Other embodiments of the two-dimensional photonic crystal according to the present invention are hereinafter described. In the following description, the structural elements that are identical to those of the previously described two-dimensional photonic crystal 10 are denoted by the same numerals, and detailed explanations of such elements are omitted.

Figure 5:
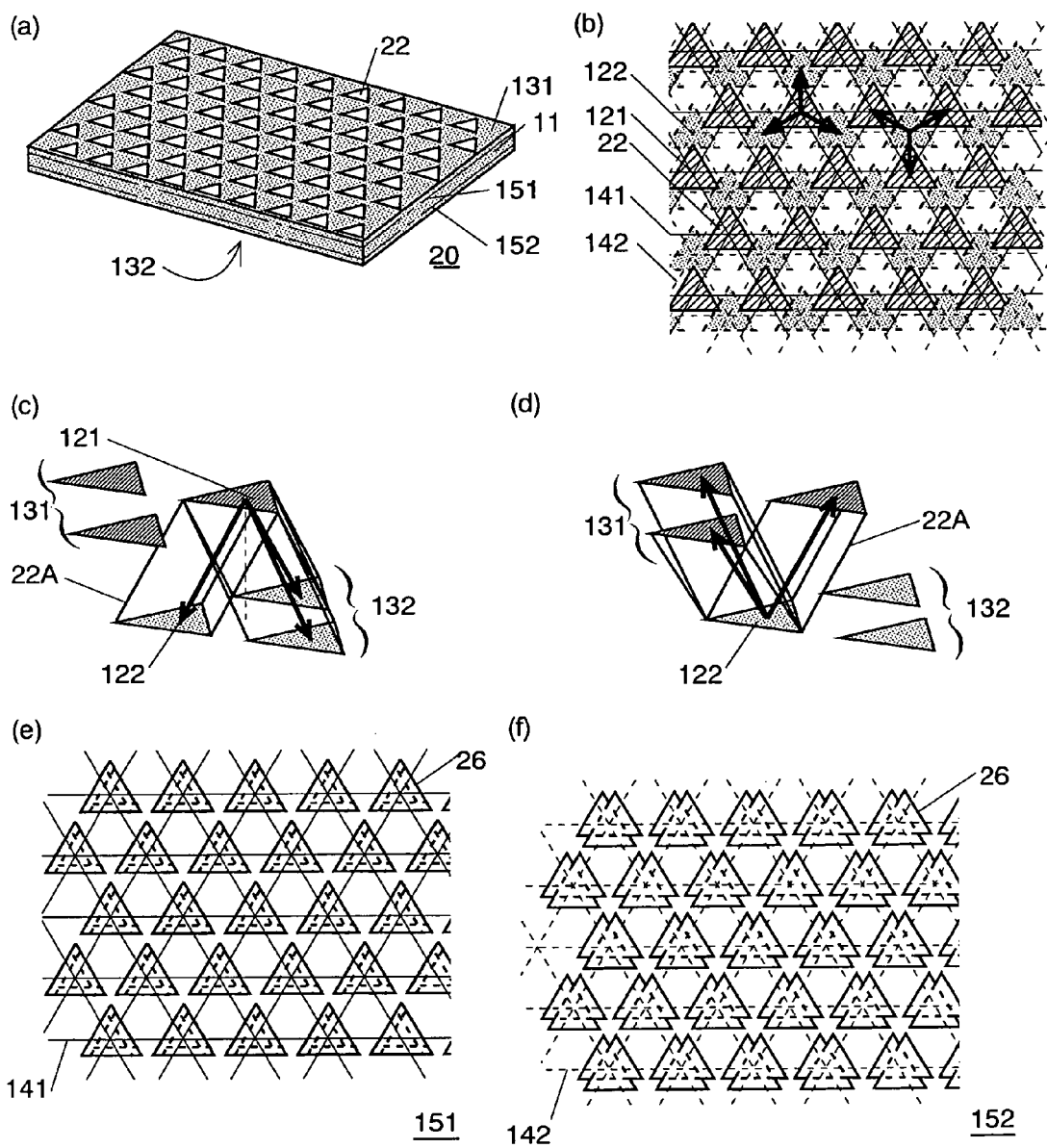
FIGS. 5(*a*) to 5(*f*) show an embodiment of the two-dimensional photonic crystal with equilateral-triangular holes, where (a) is a perspective view of the body, (b) is a surface view of a first surface 131 and second surface, (c) and (d) are perspective views showing the shape of air columns 22A, and (e) and (f) are sectional views of the two-dimensional photonic crystal at in-plane sections 151 and 152, respectively.
Figure 6:
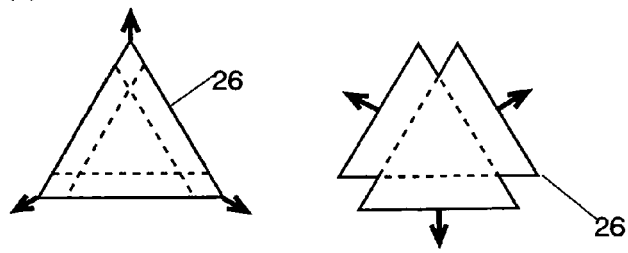
FIGS. 6(*a*) and 6(*b*) are plan views showing the shape of a periodic structural unit 26 in the two-dimensional photonic crystal 20.
Figure 7:
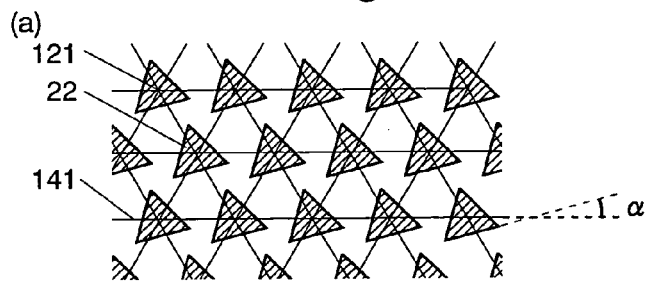
FIGS. 7(a) and 7(b) show another embodiment of the two-dimensional photonic crystal with equilateral-triangular holes, where (a) is a plan view of the body and (b) is a plan view showing the shape of the periodic structural unit 26.
Figure 7:
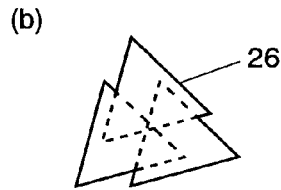

Initially, a two-dimensional photonic crystal 20 with equilateral-triangular holes 22 arranged in a triangular lattice pattern is described with reference to FIGS. 5 and 6. This is an example of the two-dimensional photonic crystal with modified refractive index areas having a three-fold rotational symmetry.

FIG. 5(a) is a perspective view of the two-dimensional photonic crystal 20. On the first surface 131 of the body 11, the equilateral-triangular holes 22 are located at the lattice points 121 of the triangular lattice, with each hole being oriented so that its sides are each substantially parallel to the lattice. The equilateral-triangular holes 22 on the second surface 132 are located at positions complementary to those on the first surface 131 and oriented in the same manner as the holes on the first surface 131 (FIG. 5(b)).

Three air columns 22A extend from each lattice point 121 on the first surface 131 to the three nearest lattice points on the second surface 132, respectively (FIGS. 5(b) and 5(c)). Similarly, three air columns 22A extend from each lattice point 122 on the second surface 132 to the three nearest lattice points on the first surface 131, respectively (FIGS. 5(b) and 5(d)).

A triangular lattice with a periodic structural unit 26 including three holes 22 is created at any in-plane section. FIGS. 5(e) and 5(f) illustrate the arrangements of the periodic structural unit 26 at the in-plane sections 151 and 152, respectively, and FIGS. 6(a) and 6(b) each show an enlarged view of the periodic structural unit 26 at each of the two in-plane sections. The directions of the thick arrows in FIGS. 6(a) and 6(b) correspond to those of the thick arrows in FIGS. 5(b) to 5(d). At the in-plane section 151, the periodic structural unit 26 is in the form of a equilateral triangle consisting of three equilateral triangles overlapping each other. At the in-plane section 152, the periodic structural unit 26 consists of three equilateral triangles overlapping each other, with each triangle being shifted in the direction perpendicular to a different side. These periodic structural units 26 are all $C_{3v}$ symmetrical. Due to this symmetry a complete PBG is created for the two-dimensional photonic crystal 20.

In the two-dimensional photonic crystal 20, each hole 22 is arranged so that its sides are each parallel to the lattice. This arrangement can be modified as shown in FIG. 7(a), in which the sides of the hole 22 are inclined at the same angle a from the lattice. In this case, the periodic structural unit has a three-fold rotational symmetry, although it is not $C_{3v}$ symmetrical (FIG. 7(b)). Therefore, a two-dimensional photonic crystal with such holes also has a complete PBG.

Figure 8:
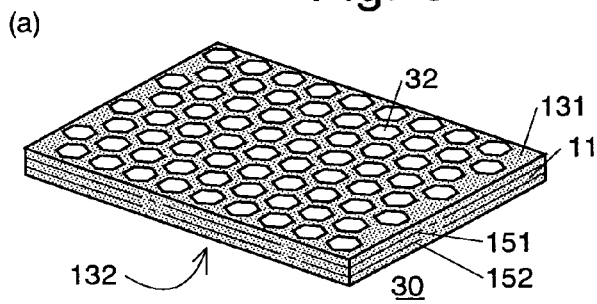
FIGS. 8(a) to 8(d) show an embodiment of the two-dimensional photonic crystal with regular-hexagonal holes, where (a) is a perspective view of the body, (b) is a surface view of a first surface 131 and second surface, and (c) and (d) are perspective views showing the shape of air columns 32A.
Figure 8:
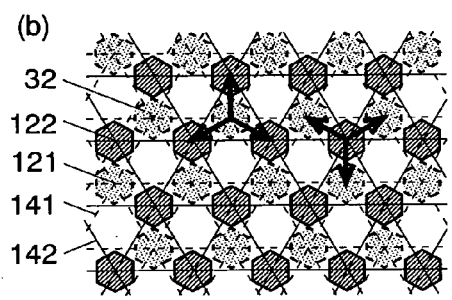
Figure 8:
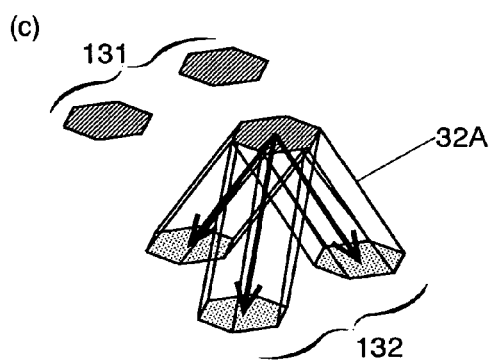
Figure 8:
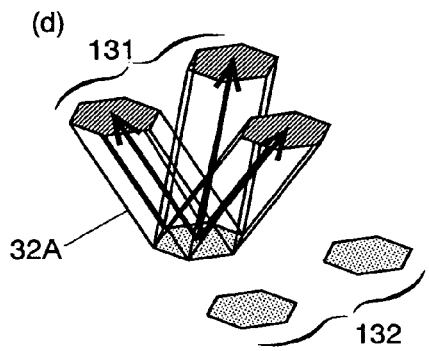
Figure 9:
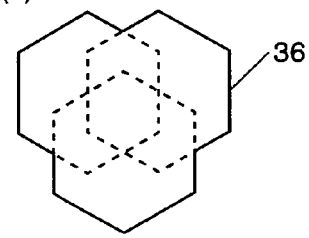
FIGS. 9(a) and 9(b) are plan views showing the shape of the periodic structural unit 36 in the two-dimensional photonic crystal 30.
Figure 9:
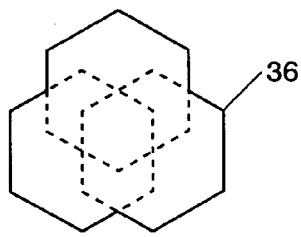

FIG. 8 shows a two-dimensional photonic crystal 30 with regular-hexagonal holes 32 arranged in a triangular lattice pattern. This is an example of the two-dimensional photonic crystal with modified refractive index areas having a six-fold rotational symmetry. FIG. 8(a) is a perspective view of the two-dimensional photonic crystal 30. On the first surface 131 of the body 11, regular-hexagonal holes 32 are arranged at the lattice points 121 of the triangular lattice. On the second surface 132, the regular-hexagonal holes 32 are arranged at positions complementary to those on the first surface 131 and oriented in the same manner as the holes on the first surface 131 (FIG. 8(b)). Each hole 32 is oriented so that each side of the regular hexagon perpendicularly intersects the triangular lattice. Air columns 32A extend from each of the lattice point 121 on the first surface 131 and the lattice points 122 on the second surface 132, as in the two-dimensional photonic crystals 10 and 20 (FIGS. 8(c) and 8(d)).

The periodic structural unit 36 at each of the in-plane sections 151 and 152 in the two-dimensional photonic crystal 30 is arranged in a triangular lattice pattern, as in the two-dimensional photonic crystals 10 and 20. FIGS. 9(a) and 9(b) show in-plane sectional shapes of the periodic structural unit 36. These in-plane sectional shapes each consist of three regular hexagons overlapping each other and being shifted in different directions with 120° angular intervals, thus forming a $C_{3v}$-symmetrical shape. Due to this symmetry, a complete PBG is created for the two-dimensional photonic crystal 30.

Figure 10:
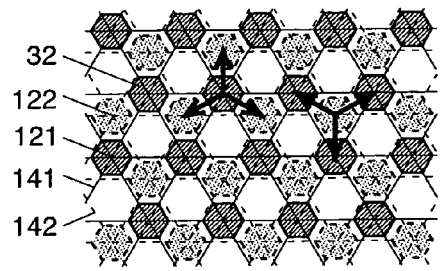
FIG. 10 is a plan view of another example of the arrangement of regular-hexagonal holes.
Figure 11:
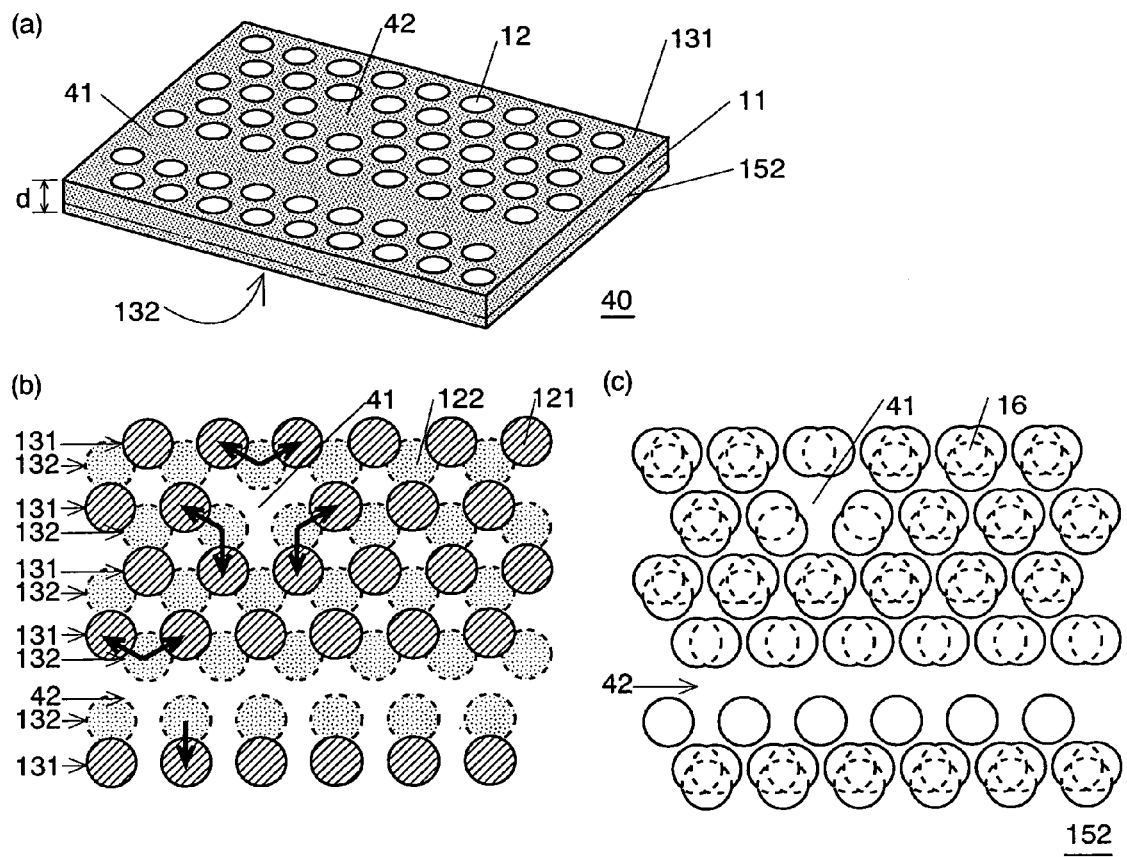
FIGS. 11(a) to 11(c) are a perspective view and cross-sectional views showing an example of a wavelength multiplexer/demultiplexer using a two-dimensional photonic crystal according to the present embodiment.

Instead of having the six sides perpendicularly intersecting the triangular lattice, the regular-hexagonal hole 32 may be oriented so that the six sides are parallel to the triangular lattice, as shown in FIG. 10. The periodic structural unit 36 in this case also has a $C_{3v}$-symmetrical in-plane section. It is possible to arrange the holes so that the sides of the regular hexagon are inclined at the same angle (other than 0 and 90 degrees) from the lattice. This design also creates a complete PBG since the periodic structural unit has a six-fold rotational symmetry although it does not have a $C_{6v}$ symmetry.

FIGS. 11(a) to 11(c) illustrate an optical multiplexer/demultiplexer 40 as an application example of the two-dimensional photonic crystal 10 of the present embodiment. This optical multiplexer/demultiplexer 40 has a linear defect created by removing (or omitting) three holes 12 extending from each of the lattice points 121 forming one row, and also a point-like defect created by omitting three holes 12 extending from one lattice point 121 separated from the linear defect by three rows. The linear defect functions as a waveguide 41 and the point-like defect as a resonator 42.

At both the waveguide 41 and resonator 42, a defect level is created within the complete PBG. Accordingly, the waveguide 41 can propagate light having a wavelength within a specific wavelength band included in the complete PBG, and the resonator 42 will resonate with light having a specific wavelength within the complete PBG. Providing the resonator 42 in the vicinity of the waveguide 41 enables the optical multiplexer/demultiplexer 40 to function as a demultiplexer for extracting a ray of light whose wavelength equals the resonance wavelength of the resonator 42 from rays of light propagated through the waveguide 41 and for sending the extracted light through the resonator 42 to the outside. It also functions as a multiplexer for introducing an external ray of light having the aforementioned resonance wavelength through the resonator 42 into the waveguide 41.

The transmission wavelength band of the waveguide and the resonance wavelength of the resonator can be controlled by regulating the shape of the linear defect or point-like defect. For example, as opposed to the previous case where three air columns 12A extending from each lattice point 121 included in the waveguide 41 and resonator 42 are all omitted, it is possible to omit only one or two air columns 12A. In this case, the transmission wavelength band and the resonance wavelength will be different from those of the previous waveguide 41 and resonator 42. The waveguide and resonator can be also created by providing an air column whose diameter differs from that of the other holes, by shifting the position of some of the lattice points 121 and/or 122 from the normal lattice points of the triangular lattice, or by other methods than omitting the air column 12A.

Using these methods, it is possible to create multiple resonators having different resonance wavelengths in the vicinity of the waveguide. This configuration results in an optical multiplexer/demultiplexer in which each resonator multiplexes or demultiplexes light of a different wavelength.

The invention claimed is:

1. A two-dimensional photonic crystal including a slab-shaped body provided with a periodic arrangement of modified refractive index areas whose refractive index differs from that of the body, wherein:
   on a first surface, which is one of surfaces of the body, the modified refractive index areas are arranged in a triangular lattice pattern and have at least a three-fold rotational symmetry with respect to each lattice point;
   on a second surface, which is the other surface of the body, the modified refractive index areas are arranged in a triangular lattice pattern whose position is complementary to the triangular lattice on the first surface, and have at least a three-fold rotational symmetry with respect to each lattice point; and
   the modified refractive index area has columns each extending from one lattice point on the first surface to each of three lattice points on the second surface that are nearest to the aforementioned lattice point on the first surface and each of the columns has an oblique cylindrical shape with a continuous smooth wall.

2. The two-dimensional photonic crystal according to claim 1, wherein a periodic structural unit consisting of three neighboring modified refractive index areas has a $C_{3v}$ or $C_{6v}$ symmetry at a section parallel to the body.

3. The two-dimensional photonic crystal according to claim 2, wherein a sectional shape of the column at the section parallel to the body is a circle.

4. The two-dimensional photonic crystal according to claim 1, wherein the modified refractive index areas are holes.

5. An optical resonator device, comprising a two-dimensional photonic crystal according to claim 1, in which a point-like defect of the modified refractive index areas is provided.

6. An optical waveguide device, comprising a two-dimensional photonic crystal according to claim 1, in which a linear defect of the modified refractive index areas is provided.

7. An optical multiplexer/demultiplexer, comprising a two-dimensional photonic crystal according to claim 1, at least one optical waveguide consisting of a linear defect of the modified refractive index areas provided in the two-dimensional photonic crystal, and at least one optical resonator consisting of a point-like defect provided in the vicinity of the optical waveguide.

8. The two-dimensional photonic crystal according to claim 2, wherein the modified refractive index areas are holes.

9. The two-dimensional photonic crystal according to claim 3, wherein the modified refractive index areas are holes.

10. The two-dimensional photonic crystal according to claim 2, wherein a sectional shape of the column at the section parallel to the body is a equilateral triangle whose three sides are parallel to the triangular lattice.

11. The two-dimensional photonic crystal according to claim 2, wherein a sectional shape of the column at the section parallel to the body is a regular hexagon whose sides are parallel or perpendicular to the triangular lattice.

12. The two-dimensional photonic crystal according to claim 1, wherein the two-dimensional photonic crystal is a single layer.

* * * * *